United States Patent
He et al.

(10) Patent No.: US 12,315,122 B2
(45) Date of Patent: May 27, 2025

(54) OPTICAL FIBER IMAGE CALIBRATION METHOD AND APPARATUS, AND COMPUTER-READABLE STORAGE MEDIUM

(71) Applicants: WUXI HISKY MEDICAL TECHNOLOGIES CO., LTD., Suzhou (CN); SUZHOU MICROVIEW MEDICAL TECHNOLOGIES CO., LTD., Suzhou (CN)

(72) Inventors: Qiong He, Suzhou (CN); Jinhua Shao, Suzhou (CN); Jin Sun, Suzhou (CN); Di Bai, Suzhou (CN)

(73) Assignees: WUXI HISKY MEDICAL TECHNOLOGIES CO., LTD., Jiangsu (CN); SUZHOU MICROVIEW MEDICAL TECHNOLOGIES CO., LTD., Jiangsu (CN)

( * ) Notice: Subject to any disclaimer, the term of this patent is extended or adjusted under 35 U.S.C. 154(b) by 0 days.

(21) Appl. No.: 18/424,052

(22) Filed: Jan. 26, 2024

(65) Prior Publication Data
US 2024/0169505 A1    May 23, 2024

Related U.S. Application Data

(63) Continuation of application No. PCT/CN2022/108040, filed on Jul. 26, 2022.

(30) Foreign Application Priority Data

Jul. 28, 2021    (CN) .......................... 202110856709.1

(51) Int. Cl.
G06T 5/92    (2024.01)
G06T 5/50    (2006.01)

(52) U.S. Cl.
CPC .................. *G06T 5/92* (2024.01); *G06T 5/50* (2013.01); *G06T 2207/20224* (2013.01)

(58) Field of Classification Search
CPC ... G06T 5/92; G06T 5/50; G06T 2207/20224; G06T 5/90; G06T 7/66; G06T 7/90;
(Continued)

(56) References Cited

U.S. PATENT DOCUMENTS

| | | |
|---|---|---|
| 2010/0274082 A1 | 10/2010 | Iguchi et al. |
| 2015/0204784 A1* | 7/2015 | Crandall ................... G06T 5/40 |
| | | 250/252.1 |

(Continued)

FOREIGN PATENT DOCUMENTS

| | | | | |
|---|---|---|---|---|
| CN | 103959328 A | * | 7/2014 | ........... G02B 21/365 |
| CN | 107995412 A | | 5/2018 | |

(Continued)

*Primary Examiner* — Jose L Couso
(74) *Attorney, Agent, or Firm* — SALIWANCHIK, LLOYD & EISENSCHENK

(57) ABSTRACT

The present disclosure relates to an optical fiber image correction method, device and computer readable storage medium. The method comprises: obtaining a current optical fiber image and a central reference position of an optical fiber; in the current optical fiber image, correcting a central position of each optical fiber unit in the current optical fiber image according to a position difference condition between the central reference position of the optical fiber and a target position determined based on gray values in a neighboring range of the central reference position of the optical fiber; correcting brightness of the current optical fiber image that has completed a position correction according to a currently determined brightness correction coefficient.

11 Claims, 8 Drawing Sheets

(58) Field of Classification Search
CPC . G06T 17/20; G06T 5/80; G06T 2207/10056; G06T 2207/10068; G06T 5/70; G06V 10/28; H04N 17/002; H04N 23/80; H04N 9/646; H04N 25/48; H04N 19/136; H04N 23/67; H04N 23/90; H04N 17/181; A61B 1/00009; A61B 1/0005; A61B 1/00165; A61B 1/00167; A61B 1/00299; A61B 1/07; G02B 21/365; G02B 23/26; G02B 6/065; G01D 18/008; G01D 5/35361; G01D 5/35364; G01R 31/1218

See application file for complete search history.

(56) References Cited

U.S. PATENT DOCUMENTS

| | | | |
|---|---|---|---|
| 2018/0045542 A1* | 2/2018 | Ramirez-Mancilla | ............... G01D 5/35358 |
| 2022/0265136 A1* | 8/2022 | Mino | ............... A61B 3/102 |

FOREIGN PATENT DOCUMENTS

| | | | | |
|---|---|---|---|---|
| CN | 111415312 A | | 7/2020 | |
| CN | 113068015 A | * | 7/2021 | ......... A61B 1/00009 |
| CN | 113570520 A | | 10/2021 | |

* cited by examiner obtaining a current optical fiber image and a central reference position of an optical fiber, wherein, the current optical fiber image is an optical fiber image acquired at the current moment, the optical fiber comprises a plurality of optical fiber units, and the central reference position of the optical fiber comprises a central reference position of each optical fiber unit ⟋101 in the current optical fiber image, correcting a central position of each optical fiber unit in the current optical fiber image according to a position difference condition between the central reference position of the optical fiber and a target position determined based on gray values in a neighboring range of the central reference position of the optical fiber ⟋102 correcting brightness of the current optical fiber image that has completed a position correction according to a currently determined brightness correction coefficient ⟋103

FIG. 2

OPTICAL FIBER IMAGE CALIBRATION METHOD AND APPARATUS, AND COMPUTER-READABLE STORAGE MEDIUM

CROSS-REFERENCE TO RELATED APPLICATIONS

This Application is a Continuation Application of International Application No. PCT/CN2022/108040, filed on Jul. 26, 2022, which claims priority to a Chinese patent application No. 202110856709.1, filed on Jul. 28, 2021 and entitled "OPTICAL FIBER IMAGE CORRECTION METHOD, DEVICE AND COMPUTER READABLE STORAGE MEDIUM", both of which are hereby incorporated by reference in their entireties.

TECHNICAL FIELD

The present disclosure relates to the field of images processing, in particular to an optical fiber image correction method, device and computer readable storage medium.

BACKGROUND

In medical observation and detection, a microendoscopics is widely used, with optical fiber and galvanometer being important components thereof, wherein a whole optical fiber is usually composed of tens of thousands of optical fiber units. Typically, a center of each optical fiber unit is fixed; in practice, however, due to limitations on galvanometer scanning accuracy and bending of the optical fiber during use, it is not possible to ensure that each scanning is at the exact same position with an endface fixed. As a result, the galvanometer scanning position and the position of the optical fiber will vary over time, and accordingly, a central position of each optical fiber unit in the whole optical fiber will also vary. This phenomenon is called optical fiber drift.

FIG. 1 exemplarily illustrates an optical fiber drift phenomenon. Wherein, the background of FIG. 1 is an optical fiber mesh image, a dot mark position represents a central position of each optical fiber unit extracted from the optical fiber image obtained at the current moment, and a fork mark position represents a central position of each optical fiber unit in the optical fiber image of a certain frame obtained previously. Ideally, the centers of optical fiber units in the same optical fiber are exactly the same at various moments during the same use, however, as shown in FIG. 1, there is some pixel difference in the central positions between two moments due to the optical fiber drift phenomenon. In the process of reconstructing the image, it is necessary to determine the central position of each optical fiber unit to implement a fast de-meshing method, and the optical fiber drift will make the information of the optical fiber located in a wrong position be extracted when processing the optical fiber image, thus greatly influencing the quality of the image.

SUMMARY

Aiming at the technical problems existing in the prior art, the present disclosure provides an optical fiber image correction method, device and computer readable storage medium, which, in the process of observing objects with the microendoscopic, not only can quickly and efficiently realize correction of the optical fiber drift aiming at the acquired optical fiber image, but also can quickly and efficiently realize real-time correction of parameters, thereby improving the quality of the optical fiber image during observation and ensuring consistency of the quality of the optical fiber image so as to improve the accuracy of subsequent diagnosis.

According to a first aspect of the present disclosure, an optical fiber image correction method is proposed. The method may comprise: obtaining a current optical fiber image and a central reference position of an optical fiber, wherein, the current optical fiber image is an optical fiber image acquired at the current moment, the optical fiber comprises a plurality of optical fiber units, and the central reference position of the optical fiber comprises a central reference position of each optical fiber unit; in the current optical fiber image, correcting a central position of each optical fiber unit in the current optical fiber image according to a position difference condition between the central reference position of the optical fiber and a target position determined based on gray values in a neighboring range of the central reference position of the optical fiber; correcting brightness of the current optical fiber image that has completed a position correction according to a currently determined brightness correction coefficient.

In some embodiments, "obtaining a central reference position of an optical fiber" comprises: obtaining a pre-stored central reference position of an optical fiber; or extracting a central position of each optical fiber unit from a previously obtained optical fiber image, and taking an extracted central position of each optical fiber unit as the central reference position of the optical fiber.

In some embodiments, the previously obtained optical fiber image is acquired earlier than the current optical fiber image.

In some embodiments, "in the current optical fiber image, correcting a central position of each optical fiber unit in the current optical fiber image according to a position difference condition between the central reference position of the optical fiber and a target position determined based on gray values in a neighboring range of the central reference position of the optical fiber", comprises: in the current optical fiber image, determining a position with the maximum gray value in each neighboring range by taking the central reference position of each optical fiber unit as an origin and searching in the neighboring range of each origin separately; correcting a central position of each optical fiber unit in the current optical fiber image according to position difference condition between the position with the maximum gray value in each neighboring range and the central reference position of each optical fiber unit in the current optical fiber image.

In some embodiments, the brightness correction coefficient is determined by the following steps: obtaining a pre-stored gain coefficient and a pre-stored bias coefficient, and determining the brightness correction coefficient according to the pre-stored gain coefficient and the pre-stored bias coefficient; or determining a gain coefficient and a bias coefficient by performing regression and fitting on gray values of a series of optical fiber images changing over time; determining the brightness correction coefficient based on a determined gain coefficient and a determined bias coefficient.

In some embodiments, "determining a gain coefficient and a bias coefficient by performing regression and fitting on gray values of a series of optical fiber images changing over time", comprises: determining the gain coefficient and the bias coefficient based on changes of brightness over time at a central position of each optical fiber unit in an optical fiber image and changes of brightness relationships over time between central positions of each optical fiber unit in an optical fiber image.

In some embodiments, the gain coefficient and the bias coefficient are determined according to the following formulas (1) and (2):

$$v_j(t) = \frac{\alpha_j}{\alpha_i}(v_i(t) - \beta_i) + \beta_j + \varepsilon_{ij}(t) \qquad \text{formula (1)}$$

$$v_j(t) \simeq \frac{\alpha_j}{\alpha_i}v_i(t) + \beta_j - \frac{\alpha_j}{\alpha_i}\beta_i \qquad \text{formula (2)}$$

correcting brightness of the current optical fiber image that has completed a position correction according to a formulas (3):

$$u_i(t) = \alpha_i v_i(t) + \beta_i \qquad \text{formula (3)}$$

wherein $u_i(t)$ represents a gray value of the corrected central position of the i-th optical fiber unit in the t-th frame optical fiber image, $v_i(t)$ represents a gray value of the central position of the i-th optical fiber unit in the t-th frame optical fiber image, $v_j(t)$ represents a gray value of the central position of the j-th optical fiber unit in the t-th frame optical fiber image, $\alpha_i$ represents a gain coefficient of the gray value of the central position of the i-th optical fiber unit, $\beta_i$ represents a bias coefficient of the gray value of the central position of the i-th optical fiber unit, $\alpha_j$ represents a gain coefficient of the gray value of the central position of the j-th optical fiber unit, $\beta_j$ represents a bias coefficient of the gray value of the central position of the j-th optical fiber unit, and $\varepsilon_{ij}(t)$ represents an error term between a fitted curve and gray values of the central positions of the i-th optical fiber unit and the j-th optical fiber unit in the t-th frame optical fiber image.

In some embodiments, in a process of performing regression and fitting on gray values of a series of optical fiber images changing over time, for a central position of the optical fiber unit whose regression-fitting error is greater than a preset threshold, abandoning gray values of the central position of the optical fiber unit whose regression-fitting error is greater than the preset threshold; and/or when the number of the central position of the optical fiber unit whose regression-fitting error is greater than a preset threshold exceeds a preset number of positions, abandoning regression and fitting on the series of optical fiber images changing over time.

In some embodiments, "correcting brightness of the current optical fiber image that has completed a position correction" further comprises: in the current optical fiber image, dividing a graphical mesh corresponding to each optical fiber unit with the central position of each of corrected optical fiber units as a vertex; for each position other than the vertex in the current optical fiber image, based on a corrected gray value of the central position of each of the corrected optical fiber units contained in the graphical mesh where the each position is located, determining the corrected gray values by using distance-based weighted interpolation.

In some embodiments, the method may further comprise: storing the central position of each optical fiber unit in the current optical fiber image that has completed a position correction, so as to obtain the central reference position of the optical fiber.

According to a second aspect of the present disclosure, an optical fiber image correction device is proposed. The device may comprise an obtaining module, a drift correction module and a brightness correction module. The obtaining module may be configured for obtaining a current optical fiber image and a central reference position of an optical fiber, wherein, the current optical fiber image is an optical fiber image acquired at the current moment, the optical fiber comprises a plurality of optical fiber units, and the central reference position of the optical fiber comprises a central reference position of each optical fiber unit. The drift correction module may be configured for in the current optical fiber image, correcting a central position of each optical fiber unit in the current optical fiber image according to a position difference condition between the central reference position of the optical fiber and a target position determined based on gray values in a neighboring range of the central reference position of the optical fiber. The brightness correction module may be configured for correcting brightness of the current optical fiber image that has completed a position correction according to a currently determined brightness correction coefficient.

In some embodiments, the obtaining module is optionally configured for: obtaining a pre-stored central reference position of an optical fiber; or extracting a central position of each optical fiber unit from a previously obtained optical fiber image, and taking an extracted central position of each optical fiber unit as the central reference position of the optical fiber.

In some embodiments, the previously obtained optical fiber image is acquired earlier than the current optical fiber image.

In some embodiments, the drift correction module is optionally configured for: in the current optical fiber image, determining a position with the maximum gray value in each neighboring range by taking the central reference position of each optical fiber unit as an origin and searching in the neighboring range of each origin separately; correcting a central position of each optical fiber unit in the current optical fiber image according to position difference condition between the position with the maximum gray value in each neighboring range and the central reference position of each optical fiber unit in the current optical fiber image.

In some embodiments, the optical fiber image correction device further comprises a correction coefficient determining module, which is configured for: obtaining a pre-stored gain coefficient and a pre-stored bias coefficient, and determining the brightness correction coefficient according to the pre-stored gain coefficient and the pre-stored bias coefficient; or determining a gain coefficient and a bias coefficient by performing regression and fitting on gray values of a series of optical fiber images changing over time; determining the brightness correction coefficient based on a determined gain coefficient and a determined bias coefficient.

In some embodiments, the correction coefficient determining module is optionally configured for: determining the gain coefficient and the bias coefficient based on changes of brightness over time at a central position of each optical fiber unit in an optical fiber image and changes of brightness relationships over time between central positions of each optical fiber unit in an optical fiber image.

In some embodiments, the gain coefficient and the bias coefficient are determined according to the following formulas (1) and (2):

$$v_j(t) = \frac{\alpha_j}{\alpha_i}(v_i(t) - \beta_i) + \beta_j + \varepsilon_{ij}(t) \qquad \text{formula (1)}$$

-continued $$\upsilon_j(t) \simeq \frac{\alpha_j}{\alpha_i}\upsilon_i(t) + \beta_j - \frac{\alpha_j}{\alpha_i}\beta_i \qquad \text{formula (2)}$$

correcting brightness of the current optical fiber image that has completed a position correction according to a formulas (3):

$$u_i(t) = \alpha_i \upsilon_i(t) + \beta_i \qquad \text{formula (3)}$$

wherein $u_i(t)$ represents a gray value of the corrected central position of the i-th optical fiber unit in the t-th frame optical fiber image, $\upsilon_i(t)$ represents a gray value of the central position of the i-th optical fiber unit in the t-th frame optical fiber image, $\upsilon_j(t)$ represents a gray value of the central position of the j-th optical fiber unit in the t-th frame optical fiber image, $\alpha_i$ represents a gain coefficient of the gray value of the central position of the i-th optical fiber unit, $\beta_i$ represents a bias coefficient of the gray value of the central position of the i-th optical fiber unit, $\alpha_j$ represents a gain coefficient of the gray value of the central position of the j-th optical fiber unit, $\beta_j$ represents a bias coefficient of the gray value of the central position of the j-th optical fiber unit, and $\varepsilon_{ij}(t)$ represents an error term between a fitted curve and gray values of the central positions of the i-th optical fiber unit and the j-th optical fiber unit in the t-th frame optical fiber image.

In some embodiments, the correction coefficient determining module is specifically configured for: in a process of performing regression and fitting on gray values of a series of optical fiber images changing over time: for a central position of the optical fiber unit whose regression-fitting error is greater than a preset threshold, abandoning gray values of the central position of the optical fiber unit whose regression-fitting error is greater than the preset threshold; and/or when the number of the central position of the optical fiber unit whose regression-fitting error is greater than a preset threshold exceeds a preset number of positions, abandoning regression and fitting on the series of optical fiber images changing over time.

In some embodiments, the optical fiber image correction device further comprises a meshing module, which is configured for: in the current optical fiber image, dividing a graphical mesh corresponding to each optical fiber unit with the central position of each of corrected optical fiber units as a vertex; for each position other than the vertex in the current optical fiber image, based on a corrected gray value of the central position of each of the corrected optical fiber units contained in the graphical mesh where the each position is located, determining the corrected gray values by using distance-based weighted interpolation.

In some embodiments, the optical fiber image correction device further comprises a storage module, which is configured for: storing the central position of each optical fiber unit in the current optical fiber image that has completed a position correction, so as to obtain the central reference position of the optical fiber.

According to a third aspect of the present disclosure, an optical fiber image correction device is proposed. The optical fiber image correction device comprises a processor and a memory, and the memory stores a computer executable instruction therein, and the processor may be configured, when executing the computer executable instruction, to implement the optical fiber image correction method according to any one of the embodiments of the present disclosure.

According to a fourth aspect of the present disclosure, a computer readable storage medium is proposed. The computer readable storage medium stores a computer executable instruction therein, and the computer executable instruction may be configured, when executed by a processor, to implement the optical fiber image correction method according to any one of the embodiments of the present disclosure.

According to a fifth aspect of the present disclosure, a computer executable instruction is proposed. The computer executable instruction is configured, when executed by a processor, to implement the optical fiber image correction method according to any one of the embodiments of the present disclosure.

With the optical fiber image correction method, the optical fiber image correction device and the medium according to any one of the embodiments of the present disclosure, it, in the process of observing objects with the microendoscopic, not only can quickly and efficiently realize correction of the optical fiber drift aiming at the acquired optical fiber image, but also can quickly and efficiently realize real-time correction of parameters, thereby improving the quality of the optical fiber image during observation and ensuring consistency of the quality of the optical fiber image so as to improve the accuracy of subsequent diagnosis.

BRIEF DESCRIPTION OF THE DRAWINGS

In the drawings, which are not necessarily drawn to scale, the same reference numbers may describe similar components in different views. The same reference number with a letter suffix or a different letter suffix may refer to different instances of similar components. The drawings generally show various embodiments by way of examples rather than limitations, and together with the description and claims, serve to explain the disclosed embodiments. Such embodiments are illustrative and are not intended to be exhaustive or exclusive embodiments of the present apparatus or method.

FIG. 2 illustrates a flowchart of an optical fiber image correction method according to an embodiment of the present disclosure;

FIG. 4 (b) illustrates a schematic diagram of a graphical mesh according to an embodiment of the present disclosure;

FIG. 6 (b) illustrates a diagram of a part of an optical fiber image which is obtained without discarding the data of a portion of the optical fiber unit with a large fitting deviation, according to an embodiment of the present disclosure;

DETAILED DESCRIPTION

Figure 1:
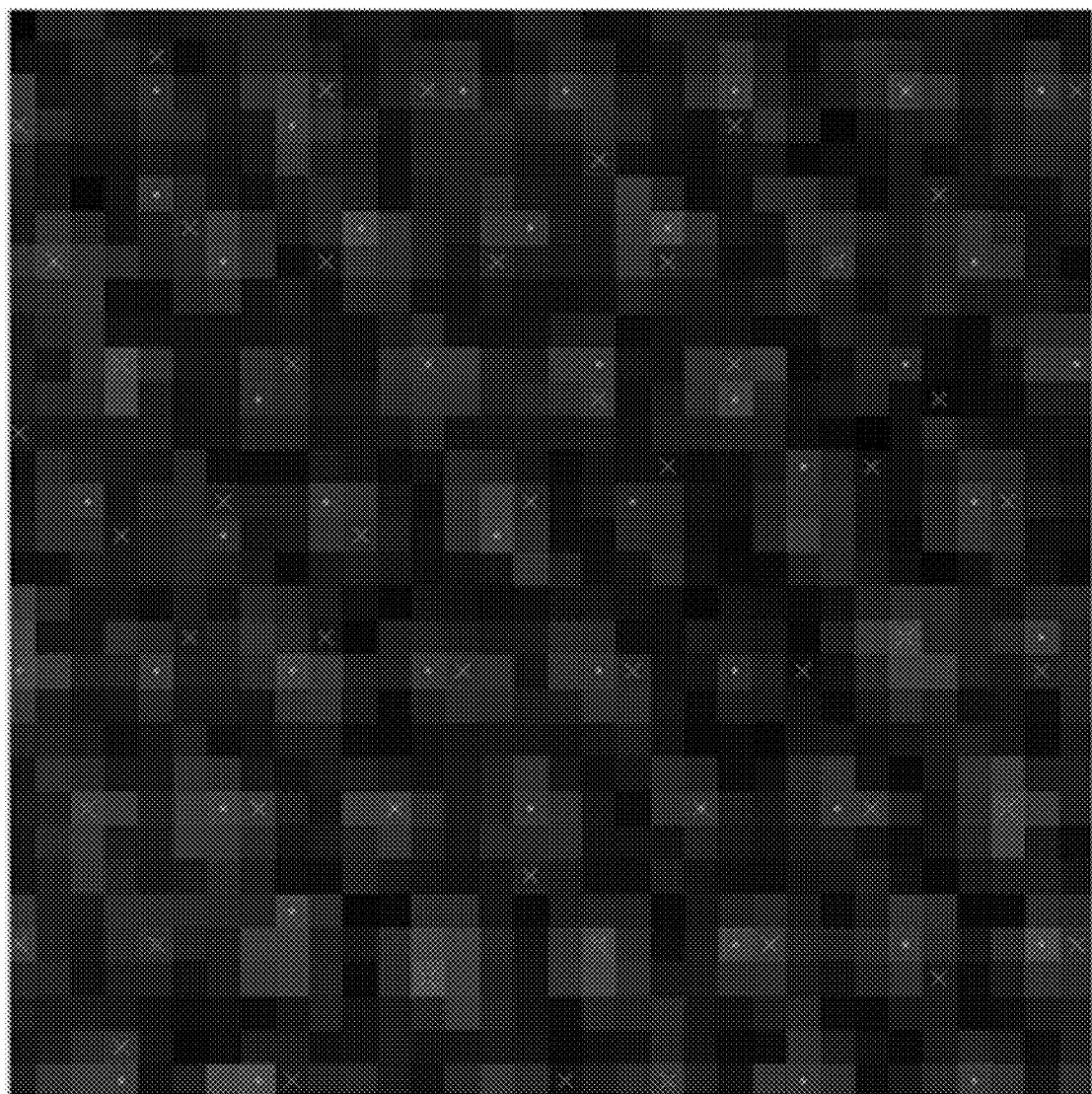
FIG. 1 illustrates a schematic diagram of an optical fiber drift phenomenon according to the prior art.

In order to enable those skilled in the art to better understand the technical solution of the present disclosure, the present disclosure is described in detail below in conjunction with the drawings and specific embodiments. The embodiments of the present disclosure are described in further detail below in conjunction with the drawings and specific embodiments, but are not used as a limitation of the present disclosure.

The terms "first", "second" and similar terms used in this disclosure do not indicate any order, number or importance, but only to distinguish between different parts. Words such as "including" or "including" imply that the elements preceding the word cover the elements enumerated after the word and do not preclude the possibility of covering other elements as well. "Up", "Down", "Left", "Right", etc., are only used to indicate the relative positional relationship, and when the absolute position of the object being described changes, the relative positional relationship may also change accordingly.

In the present disclosure, when it is described that a specific device is located between a first device and a second device, there may or may not be an intermediate device between the specific device and the first device or the second device. When it is described that a particular device is connected with other devices, the particular device may be directly connected with the other devices without an intermediate device, or may be directly connected with the other devices without an intermediate device.

FIG. 2 shows a flowchart of the optical fiber image correction method according to the embodiment of the present disclosure. As shown in FIG. 2, the optical fiber image correction method comprises steps 101, 102, and 103.

In step 101, it may obtain a current optical fiber image and a central reference position of an optical fiber, wherein, the current optical fiber image is an optical fiber image acquired at the current moment, the optical fiber comprises a plurality of optical fiber units, and the central reference position of the optical fiber comprises a central reference position of each optical fiber unit.

For the current optical fiber image, the central reference position of each optical fiber unit is intended to represent a datum central position of each optical fiber unit if the optical fiber does not drift (or drifts very little), and also is intended to represent, if the optical fiber does not drift, a central position of each optical fiber unit as a datum when the central position is corrected on this basis.

In some embodiments, the central reference position of the optical fiber may be pre-stored. For example, the central reference position of the optical fiber may be preset and stored for the optical fiber image to be corrected, and may be directly recalled when the optical fiber image to be corrected is corrected.

In some embodiments, the central reference position of the optical fiber may extract a central position of each optical fiber unit from a previously obtained optical fiber image, and take an extracted central position of each optical fiber unit as the central reference position of the optical fiber.

In some embodiments, the current optical fiber image and the previously obtained optical fiber image may be two frames of images adjacent in acquisition timing. For example, the acquisition time of a previously acquired optical fiber image may precede the current optical fiber image by 1 unit of time in order to achieve a more sensitive initial correction in a time domain. In still other embodiments, acquisition times of the current optical fiber image and the previously obtained optical fiber image may differ by several signal acquisition periods. For example, the acquisition moment of the previously acquired optical fiber image may precede the current optical fiber image by multiple (e.g., it can be 20) units of time in order to reduce the computational load on the device and simultaneously ensure the effectiveness of the initial correction compared to the initial correction on a moment-by-moment basis.

In step 102, it can, in the current optical fiber image, correct a central position of each optical fiber unit in the current optical fiber image according to a position difference condition between the central reference position of the optical fiber and a target position determined based on gray values in a neighboring range of the central reference position of the optical fiber. In this way, it is possible to eliminate the drift of the central position of the optical fiber unit caused by the optical fiber drift between successive times, and thus the drift of the position of the graphic mesh that is divided later with the center of each optical fiber unit as the vertex. Wherein, the center of each optical fiber unit is the center of each optical fiber unit constituting the whole optical fiber.

Specifically, for the current optical fiber image without position correction, the central position of each optical fiber unit therein is unknown, so in the current optical fiber image without position correction, the central reference position of each optical fiber unit is first used as the central position of each optical fiber unit.

Optionally, it is possible to adopt a corresponding position correction scheme for the central position of each optical fiber unit in the current optical fiber image according to a position difference condition between a position with the maximum gray value in each neighboring range of the current optical fiber image and a position of the central reference position of each optical fiber unit in the current optical fiber image. It should be noted that the correction may or may not be necessary since the correction is based on the difference condition. The above position difference condition may be reflected by the distance difference between two positions. For example, the central position of the corresponding optical fiber unit in the current optical fiber image is corrected only when the distance difference reaches a certain threshold; conversely, the optical fiber drift at that position is considered to be not severe and within acceptable limits, and then the correction is not made on the central position of the corresponding optical fiber unit in the current optical fiber image. The size of the above threshold can be set as desired. The correction in the present embodiment can be understood as a correction on position.

In some embodiments, when the difference reaches a certain threshold, the position with the maximum gray value in the neighboring range of each origin may be directly used as the corrected central position of the corresponding optical fiber unit in the current optical fiber image.

In some embodiments, the central position of each optical fiber unit in the current optical fiber image whose position has been corrected is stored, so as to obtain the central reference position of the optical fiber. The central reference position of the optical fiber is the pre-stored central reference position of an optical fiber, and is also the latest central reference position of an optical fiber.

Through steps 101 and 102, the optical fiber drift can be corrected quickly and efficiently, and the deviation of image reconstruction caused by the optical fiber drift can be reduced. When the optical fiber drift phenomenon is serious, the correction method according to the present disclosure can completely eliminate the influence of the position deviation caused by the optical fiber drift on the subsequent optical fiber image processing.

Figures 3A, 3B, 3C:
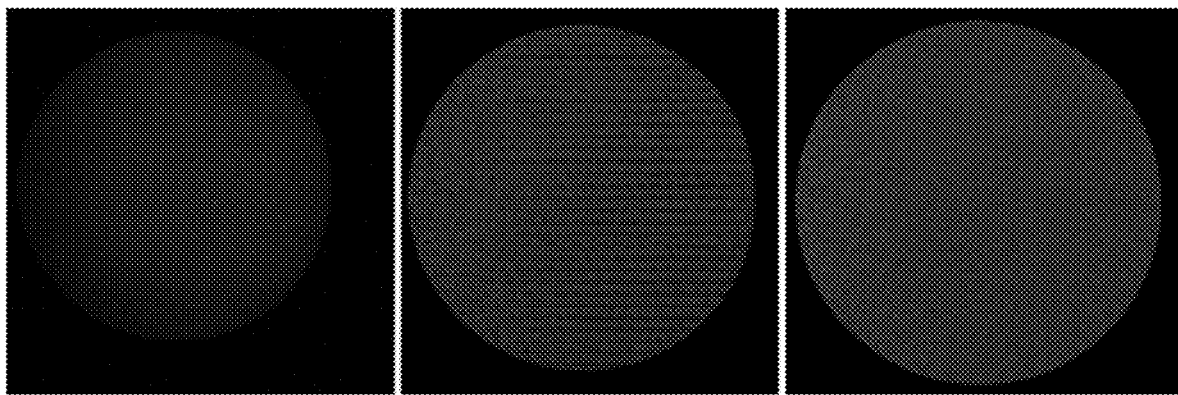
FIGS. 3(a)-3(c) respectively illustrate the comparative diagrams of parts of an original image with a mesh, a de-meshed optical fiber image without correcting drift, and a de-meshed optical fiber image after correcting the optical fiber drift with the optical fiber image correction method according to an embodiment of the present disclosure.

FIGS. 3(a)-3(c) respectively illustrate the comparative diagrams of an original optical fiber image with a mesh, a de-meshed optical fiber image without correcting drift, and a de-meshed optical fiber image after correcting the optical fiber drift with the optical fiber image correction method according to an embodiment of the present disclosure. A mesh is formed corresponding to each optical fiber unit in the optical fiber image, and thus it is generally necessary to perform a de-meshing process. Specifically, interpolation may be performed based on the gray value at the central position of the optical fiber unit to obtain the gray values at other positions, so as to achieve a de-meshing effect. It can be seen that the correction method according to any one of the embodiments of the present disclosure can eliminate the adverse effect of the deviation of the central position of the optical fiber unit on the quality of the image on which the de-meshing algorithm is performed.

In some embodiments, "in the current optical fiber image, correcting a central position of each optical fiber unit in the current optical fiber image according to a position difference condition between the central reference position of the optical fiber and a target position determined based on gray values in a neighboring range of the central reference position of the optical fiber", comprises: in the current optical fiber image, determining a position with the maximum gray value in each neighboring range by taking the central reference position of each optical fiber unit as an origin and searching in the neighboring range of each origin separately; correcting a central position of each optical fiber unit in the current optical fiber image according to position difference condition between the position with the maximum gray value in each neighboring range and the central reference position of each optical fiber unit in the current optical fiber image. In the present embodiments, the target position determined based on the gray value refers to the position with the maximum gray value. The implementation of the correction of the central position of each optical fiber unit in the current optical fiber image according to the difference condition as described above can be combined with herein.

Specifically, the neighboring range of each origin refers to the range formed by N pixels adjacent to each origin, and N can be set according to the actual demand, for example, N is equal to 10. As mentioned above, a whole optical fiber usually consists of tens of thousands of optical fiber units. Each optical fiber unit has its own central reference position, and there are tens of thousands of neighboring ranges with this as the origin.

It should be noted that the number of results to get the difference condition is the same as the number of corresponding optical fiber units in the optical fiber image. Whether to correct the central position of each optical fiber unit in the current optical fiber image depends on the difference result corresponding to the central position of the optical fiber unit, so it is possible to correct the central positions of all optical fiber units in the current optical fiber image, or to correct the central positions of only a part of the optical fiber units in the current optical fiber image, or not to correct the central positions of all optical fiber units in the current optical fiber image. For example, when the difference result corresponding to the central position of an optical fiber unit A in the current optical fiber image reaches a certain threshold, the central position of the optical fiber unit A is corrected. When the difference result does not reach a certain threshold, the central position of the optical fiber unit A is not corrected. The optical fiber unit A can be any optical fiber unit in the current optical fiber image.

In the current optical fiber image, a neighborhood search is performed based on the determined origin (i.e., the central reference position of each optical fiber unit), and is likely to be for the corrected central position. Two key parameters can be set for neighborhood search, that is, search range and search judgment criteria. The former can be dynamically selected according to the size range of the optical fiber unit, so that the search range is not greater than the size of the optical fiber unit itself, while the latter can be used in a variety of ways. Optionally, the position with the maximum gray value can be searched in each neighboring range as the central position of each optical fiber unit in the corrected current optical fiber image. The inventors take into account that under ideal conditions, the gray value of the signal at the central position of the optical fiber unit is maximized with respect to the gray value of each point in the entire size range of the optical fiber unit, and by setting the search range not larger than the size of the optical fiber unit itself and combining the search for the maximum gray value, it is possible to find the actual central position of each optical fiber unit in the current optical fiber image efficiently and accurately, so as to realize the correction of optical fiber drift.

Figure 4A:
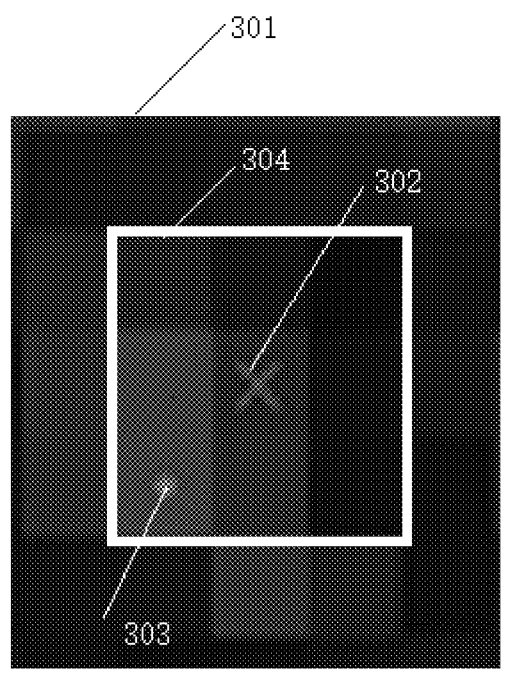
FIG. 4 (a) illustrates a schematic diagram for correcting drift of a center of an optical fiber unit according to an embodiment of the present disclosure.
Figure 4B:
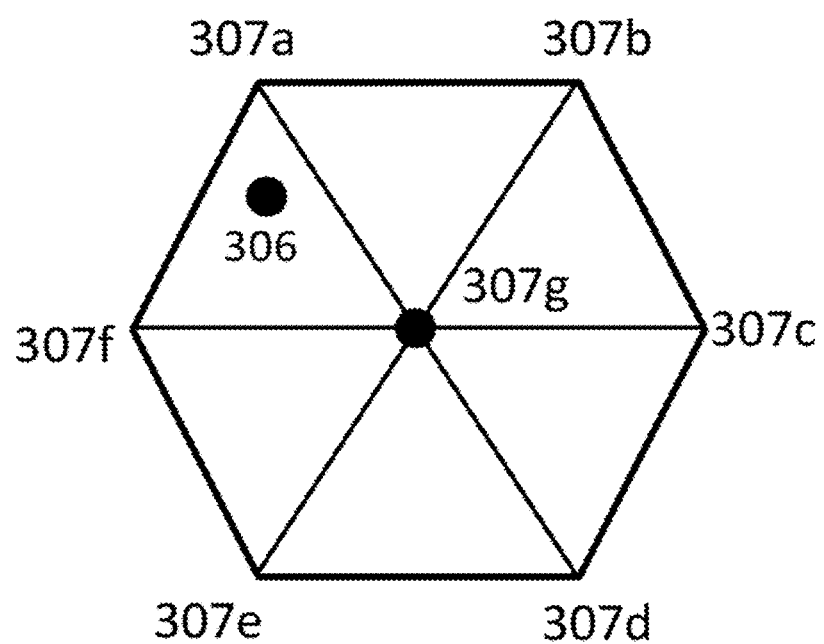

Taking an optical fiber unit as an example and illustrated with FIG. 4 (a), the optical fiber unit 301 is one optical fiber unit in the whole optical fiber. The fork marker position 302 represents the central reference position of the optical fiber unit 301, which may be extracted from the previously obtained optical fiber image, or can be obtained from the pre-stored central reference position of an optical fiber. FIG. 4 (a) shows that the central reference position, that is, the fork marker position 302, is displayed in the current optical fiber image; the fork marker position 302 is the uncorrected central position of the optical fiber unit 301 in the current optical fiber image. A fork marker position 302 is set as an origin, a search neighboring range 304 is set in the size of optical fiber unit 301, and the maximum gray value in the neighboring range 304 is searched to be the dot marker position 303. When the distance difference between the dot marker position 303 and the fork marker position 302 reaches a certain threshold, the position (i.e., the dot marker position 303) with the maximum gray scale value in the current optical fiber image is taken as the corrected central position of the optical fiber unit 301. When the distance difference between the dot marker position 303 and the fork marker position 302 does not reach a certain threshold, the central position of the optical fiber unit 301 is not corrected, i.e., the central position of the optical fiber unit 301 is still the fork marker position 302. Through the above process, the correction of the central position of the optical fiber unit 301 is completed.

According to the correction method of the present disclosure, it is possible to avoid the situation that the quality of the image is degraded due to optical fiber drift, so as to ensure the consistency of the quality of the image during the acquisition of the image.

After the drift correction is completed, in step 103, it is possible to correct brightness of the current optical fiber image that has completed a position correction according to a currently determined brightness correction coefficient.

Through steps 101-103, in the process of observing objects with the microendoscopic, it is possible to realize correction of the optical fiber drift aiming at the acquired optical fiber image quickly and efficiently, and also realize real-time correction of parameters quickly and efficiently, thereby improving the quality of the optical fiber image during observation and ensuring consistency of the quality of the optical fiber image so as to improve the accuracy of subsequent diagnosis.

Based on the continuity principle of observing natural objects through the optical fiber, the application performs real-time brightness correction on the optical fiber image. Specifically, considering that the spacing between various optical fiber units is on the order of micrometers since the size of each optical fiber unit composing the whole optical fiber bundle is extremely small, for the observation of natural images, it can be approximately considered that there is no sudden change in the natural images at this scale, that is to say, the natural images observed at this scale are continuous.

In some embodiments, the brightness correction coefficient may be determined by the following steps: obtaining a pre-stored gain coefficient and a pre-stored bias coefficient, and determining the brightness correction coefficient according to the pre-stored gain coefficient and the pre-stored bias coefficient.

Specifically, the brightness correction coefficient comprises the gain coefficient and the bias coefficient, so that in the present embodiment, the brightness correction coefficient is understood to be also pre-stored, and is called directly when performing the brightness correction on the optical fiber image to be corrected. In this way, the parameters of the optical fiber image can be corrected quickly and in real time.

In some embodiments, the brightness correction coefficient can also be determined by the following steps: determining a gain coefficient and a bias coefficient by performing regression and fitting on gray values of a series of optical fiber images changing over time; determining the brightness correction coefficient based on a determined gain coefficient and a determined bias coefficient. By way of example and not limitation, the regression and fitting may be a linear regression-fitting. With the brightness correction coefficient thus determined, the brightness correction is performed in real time on the current optical fiber image for which the position correction has been completed, and a brightness-balanced optical fiber image is obtained in practice, thereby achieving a good correction effect and thus ensuring the consistency of the quality of the optical fiber image.

Specifically, the brightness correction coefficient is composed of the gain coefficient and the bias coefficient. The brightness correction coefficient in the present application is calculated in real time according to a series of optical fiber images that change over time, and is continuously updated as the number of images increases. Each time a new frame of optical fiber image is obtained, the brightness correction will be performed on the newly obtained optical fiber image based on the current brightness correction coefficient.

Optionally, a series of optical fiber images changing over time that have completed the position correction may be selected to perform regression and fitting on their gray values, or a series of optical fiber images changing over time without the position correction may be selected to perform regression and fitting on their gray values. Optionally, the series of optical fiber images changing over time that have completed the position correction are selected to perform regression and fitting on their gray values, then the obtained gain coefficient and bias coefficient are more accurate, so the brightness correction coefficient determined based on the gain coefficient and the bias coefficient is also more accurate. By correcting the optical fiber image with the above brightness correction coefficient, it is possible to further improve the effect on correcting the image.

In some embodiments, it is possible to determine the gain coefficient and the bias coefficient based on changes of brightness over time at a central position of each optical fiber unit in an optical fiber image and changes of brightness relationships over time between central positions of each optical fiber unit in an optical fiber image.

For example, the gain coefficient and the bias coefficient may be determined according to the following formulas (1) and (2):

$$\upsilon_j(t) = \frac{\alpha_j}{\alpha_i}(\upsilon_i(t) - \beta_i) + \beta_j + \varepsilon_{ij}(t) \qquad \text{formula (1)}$$

$$\upsilon_j(t) \approx \frac{\alpha_j}{\alpha_i}\upsilon_i(t) + \beta_j - \frac{\alpha_j}{\alpha_i}\beta_i, \qquad \text{formula (2)}$$

It is possible to correct brightness of the current optical fiber image that has completed a position correction according to a formulas (3):

$$u_i(t) = \alpha_i \upsilon_i(t) + \beta_i \qquad \text{formula (3),}$$

wherein $u_i(t)$ represents a gray value of the corrected central position of the i-th optical fiber unit in the t-th frame optical fiber image, $\upsilon_i(t)$ represents a gray value of the central position of the i-th optical fiber unit in the t-th frame optical fiber image, $\upsilon_j(t)$ represents a gray value of the central position of the j-th optical fiber unit in the t-th frame optical fiber image, $\alpha_i$ represents a gain coefficient of the gray value of the central position of the i-th optical fiber unit, $\beta_i$ represents a bias coefficient of the gray value of the central position of the i-th optical fiber unit, $\alpha_j$ represents a gain coefficient of the gray value of the central position of the j-th optical fiber unit, $\beta_j$ represents a bias coefficient of the gray value of the central position of the j-th optical fiber unit, and $\varepsilon_{ij}(t)$ represents an error term between a fitted curve and gray values of the central positions of the i-th optical fiber unit and the j-th optical fiber unit in the t-th frame optical fiber image.

It should be noted that, in some cases, when the execution of the linear regression-fitting on the central position of the i-th optical fiber unit is abandoned, the values of $\alpha_i$ and $\beta_i$ will be empty, and $u_i(t)$ is equal to $\upsilon_i(t)$. At this time, it is indicated that the correction is not performed on the gradation value of the central position of the i-th optical fiber unit.

Specifically, according to formulas (1)-(3), for the central positions of each pair of optical fiber units, for example, the central position of the i-th optical fiber unit and the central position of the j-th optical fiber unit, based on the information of the gray values of the central positions of the pair of optical fiber units in a series of optical fiber images in the time domain, it is possible to solve the over-determined equation to obtain the gain coefficient $\alpha_i$ and the bias coefficient $\beta_i$ as the brightness correction coefficient of the gray value of the central position of the i-th optical fiber unit. For example, with the different performance of the correction coefficients (which are strongly correlated with the differences in throughput performance) of the central position of an optical fiber unit in different pairs of optical fibers, it is possible to iteratively solve to get the brightness correction coefficient of the gray value of the central position of each optical fiber unit.

In some embodiments, "correcting brightness of the current optical fiber image that has completed a position correction" further comprises: in the current optical fiber image, dividing a graphical mesh corresponding to each optical fiber unit with the central position of each of corrected optical fiber units as a vertex; for each position other than the vertex in the current optical fiber image, based on a corrected gray value of the central position of each of the corrected optical fiber units contained in the graphical mesh where the each position is located, determining the corrected gray values by using distance-based weighted interpolation. In this way, the correction of the gray values of the positions in the current optical fiber image other than the central position of each optical fiber unit is completed, it is possible to obtain an optical fiber image corrected for drift and brightness and de-meshed, which has high smoothness and low noise, that is, the quality of the image is better.

For example, the graphical mesh may be a triangular mesh constructed by a Delaunay triangular mesh, as shown in FIG. 4 (b), a triangular mesh 307a-307f-307g, a triangular mesh 307a-307b-307g, a triangular mesh 307b-307g-307c, a triangular mesh 307g-307c-307d, a triangular mesh 307e-307g-307d, and a triangular mesh 307f-307g-307e, and 307a-307g represent the central positions of the respective optical fiber units after correction, and are taken as the vertices of the graphical mesh corresponding to the respective optical fibers.

Next, as shown in FIG. 4 (b), for the position 306, the gray value of the position 306 may be determined based on the corrected gray values of the individual vertices 307a, 307f, and 307g of the triangular mesh 307a-307f-307g enclosing it, for example, for example, by performing a weighted sum by distance, which may also be referred to as a reconstructed gray value for the position 306.

In some embodiments, each vertex and the brightness correction coefficient thereof may be stored to be used by the drift-corrected optical fiber image acquired in a period of time, as to facilitate the rapid reconstruction and update of the optical fiber image.

In some embodiments, a large amount of data may be obtained to perform regression and fitting on the gray value of the central position of the optical fiber unit to obtain the brightness correction coefficient. However, depending on the circumstances of the acquired data, different fitting results are obtained. In some embodiments, in a process of performing regression and fitting on gray values of a series of optical fiber images changing over time, the regression-fitting error can be calculated.

Figure 5:
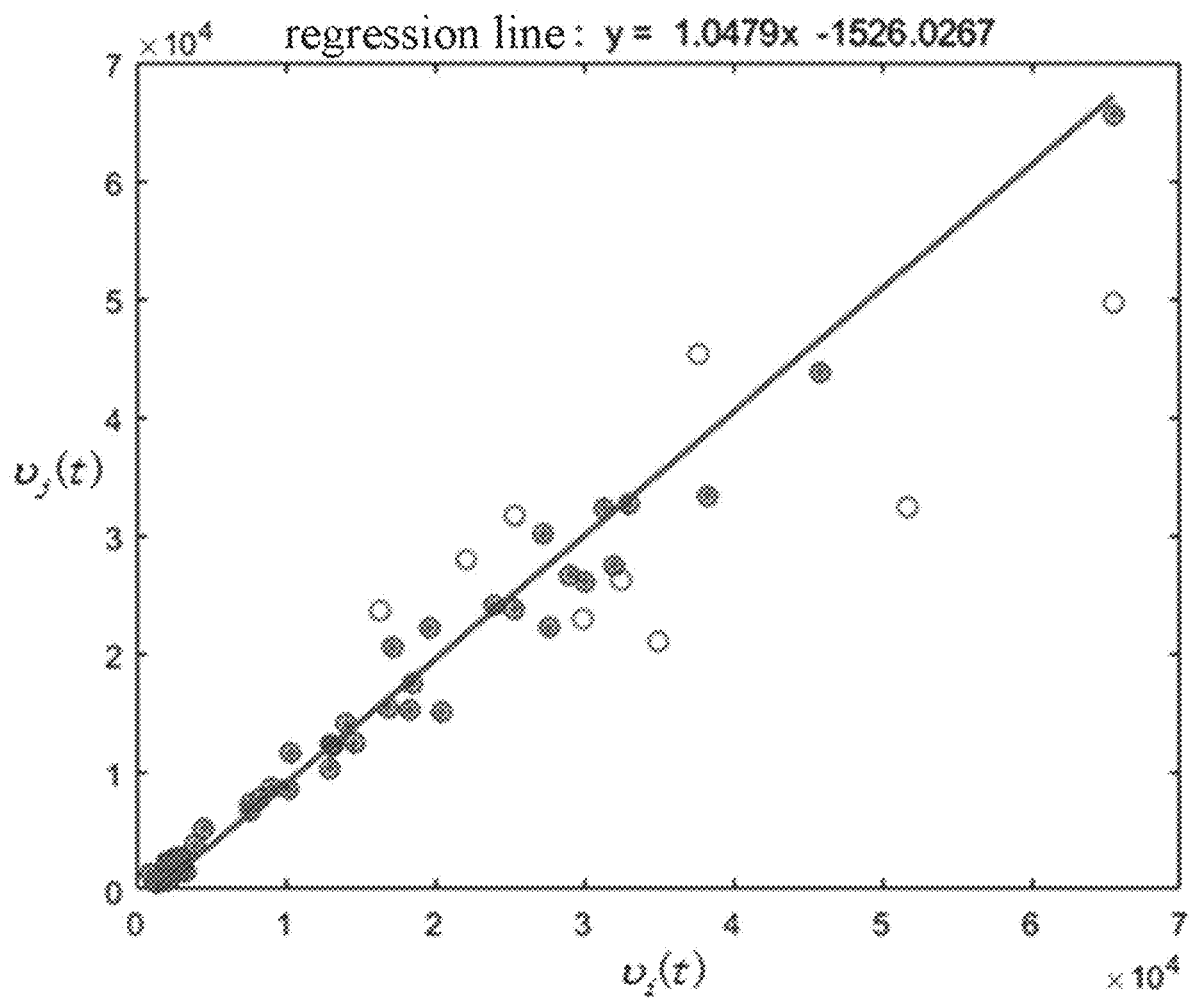
FIG. 5 illustrates a schematic diagram of performing fitting to gray values of centers of two optical fiber units as vertices according to a regression method, according to an embodiment of the present disclosure.

For example, as shown in FIG. 5, the gray value of the central position of the optical fiber unit marked by the solid circle has a small deviation from the regression line y=1.0479x−1526.0267, while the gray value of the central position of the optical fiber unit marked by the hollow circle has a large deviation from the regression line y=1.0479x−1526.0267, which means that the gray value of the central position of the optical fiber unit marked by the hollow circle has a larger regression-fitting error. The x-axis represents the gray value $v_i(t)$ of the central position of the i-th optical fiber unit changing over time, and the y-axis represents the gray value $v_j(t)$ of the central position of the j-th optical fiber unit changing over time. In some embodiments, regression-fitting error can also be the deviation estimated without regression and fitting calculation. For example, the regression-fitting error may be represented by correlation parameters of $v_i(t)$ and $v_j(t)$, including but not limited to a Pearson correlation coefficient and the like.

Figure 6A:
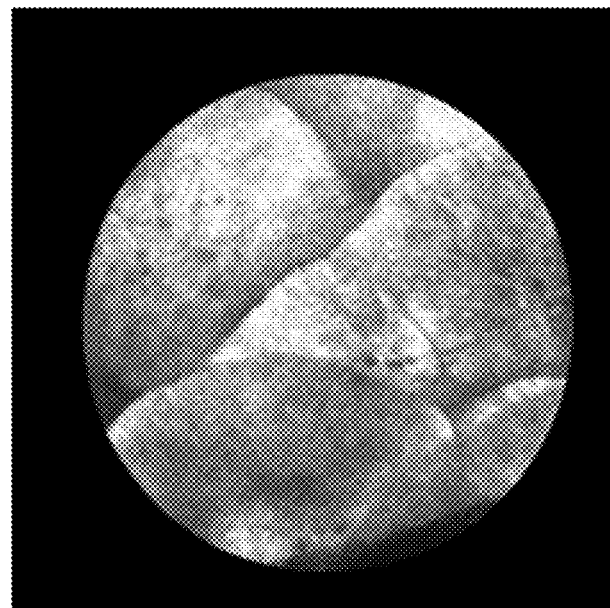
FIG. 6 (a) illustrates a diagram of a part of an optical fiber image which is obtained by discarding the data of a portion of the optical fiber unit with a large fitting deviation, according to an embodiment of the present disclosure.
Figure 6B:
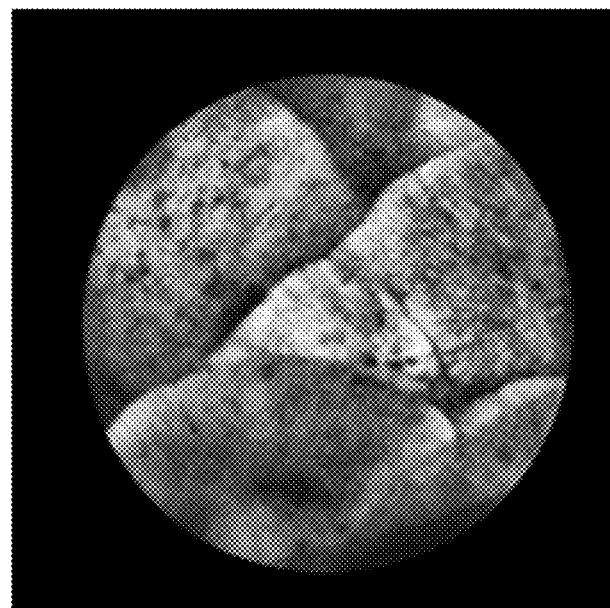

In a process of performing regression and fitting on gray values of a series of optical fiber images changing over time, for a central position of the optical fiber unit whose regression-fitting error is greater than a preset threshold, it is possible to discard the gray value of the central position of the optical fiber unit for which the regression-fitting error is greater than the preset threshold, and use the remaining data to perform the regression and fitting. The brightness correction coefficient obtained by this regression and fitting is used for performing the brightness correction, and the resulting optical fiber image is shown in FIG. 6 (a). In some embodiments, in a process of performing regression and fitting on gray values of a series of optical fiber images changing over time, when the number of the central position of the optical fiber unit whose regression-fitting error is greater than a preset threshold exceeds a preset number of positions, it is possible to discard the linear regression-fitting on a series of optical fiber images changing over time, and thus the brightness correction coefficient is not obtained at this time, and then the gray value of the position corresponding to the brightness correction coefficient in the current optical fiber image is retained. If the regression-fitting error is greater than the preset threshold of the central position of the optical fiber unit, it is considered that the brightness correction coefficient obtained by the regression and fitting distorts the gray value of the central position too much, and retaining the uncorrected gray values may reflect the true gray information to avoid excessive distortion of the true gray information. The brightness correction coefficient obtained by this regression and fitting is used for performing the brightness correction, and the resulting optical fiber image is shown in FIG. 6 (b), and as a result, more of the true gray information is retained, making the image better. Correspondingly, if the regression-fitting error is less than or equal to the preset threshold of the central position of the optical fiber unit, the it is considered that the brightness correction coefficient obtained by performing regression and fitting is appropriate, and if being used for brightness correction, an optical fiber image with balanced and reasonable brightness can be obtained.

Specifically, when the number of cases where the regression-fitting error is greater than the preset threshold of the central position of the optical fiber unit exceeds the preset number of positions, it is considered that the linear regression-fitting has deviated from the true property that the brightness of the optical fiber image changes over time, thereby discarding the linear regression-fitting on a series of optical fiber images changing over time. When the number of cases where the regression-fitting error is greater than the preset threshold of the central position of the optical fiber unit exceeds the preset number of positions, and if the brightness correction coefficient of the gray value of the central position of each optical fiber unit is still determined by regression and fitting and brightness correction is performed accordingly, it will lead to serious unsmoothing and even drown out the real image details.

Through the above processing, it can not only obtain better image quality, but also avoid the situation that the local image is affected by the imaging object or system and the whole image is abandoned, that is, the imaging quality and imaging efficiency are improved at the same time.

Figure 7:
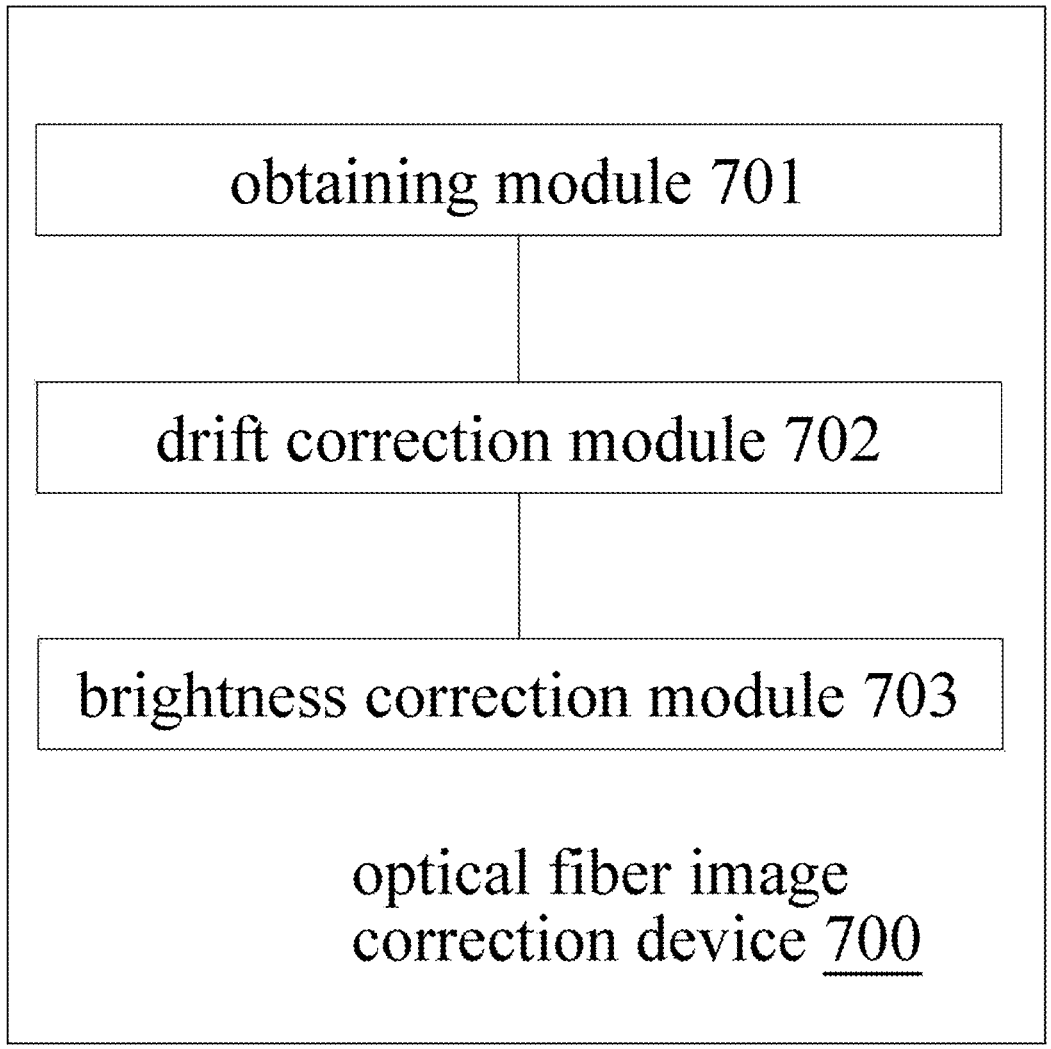
FIG. 7 illustrates a diagram of an optical fiber image correction device according to an embodiment of the present disclosure.

FIG. 7 illustrates a diagram of an optical fiber image correction device 700 according to an embodiment of the present disclosure. The optical fiber image correction device 700 may include an obtaining module 701, a drift correction module 702 and a brightness correction module 703 configured to perform steps 101, 102, and 103 shown in FIG. 2, respectively.

Specifically, The obtaining module 701 may be configured for obtaining a current optical fiber image and a central reference position of an optical fiber, wherein, the current optical fiber image is an optical fiber image acquired at the current moment, the optical fiber comprises a plurality of optical fiber units, and the central reference position of the optical fiber comprises a central reference position of each optical fiber unit. The drift correction module 702 may be configured for in the current optical fiber image, correcting a central position of each optical fiber unit in the current optical fiber image according to a position difference condition between the central reference position of the optical fiber and a target position determined based on gray values in a neighboring range of the central reference position of the optical fiber. The brightness correction module 703 may be configured for correcting brightness of the current optical fiber image that has completed a position correction according to a currently determined brightness correction coefficient. With the optical fiber image correction device 700, in the process of observing objects with the microendoscopic, it not only can quickly and efficiently realize correction of the optical fiber drift aiming at the acquired optical fiber image, but also can quickly and efficiently realize real-time correction of parameters, thereby improving the quality of the optical fiber image during observation and ensuring consistency of the quality of the optical fiber image so as to improve the accuracy of subsequent diagnosis.

In some embodiments, the obtaining module is optionally configured for: obtaining a pre-stored central reference position of an optical fiber; or extracting a central position of each optical fiber unit from a previously obtained optical fiber image, and taking an extracted central position of each optical fiber unit as the central reference position of the optical fiber.

In some embodiments, the previously obtained optical fiber image is acquired earlier than the current optical fiber image.

In some embodiments, drift correction module 702 may be optionally configured for: in the current optical fiber image, determining a position with the maximum gray value in each neighboring range by taking the central reference position of each optical fiber unit as an origin and searching in the neighboring range of each origin separately; correcting a central position of each optical fiber unit in the current optical fiber image according to position difference condition between the position with the maximum gray value in each neighboring range and the central reference position of each optical fiber unit in the current optical fiber image. After the correction, it is possible to avoid the deterioration of the image quality caused by the optical fiber drift, and thus to ensure the consistency of the image quality during acquiring the image.

In some embodiments, optical fiber image correction device 700 further comprises a storage module, which is configured for: storing the central position of each optical fiber unit in the current optical fiber image that has completed a position correction, so as to obtain the central reference position of the optical fiber.

In some embodiments, the optical fiber image correction device 700 further comprises a correction coefficient determining module, which is configured for: obtaining a pre-stored gain coefficient and a pre-stored bias coefficient, and determining the brightness correction coefficient according to the pre-stored gain coefficient and the pre-stored bias coefficient; or determining a gain coefficient and a bias coefficient by performing regression and fitting on gray values of a series of optical fiber images changing over time; determining the brightness correction coefficient based on a determined gain coefficient and a determined bias coefficient.

Specifically, for example, the correction coefficient determining module may be optionally configured for: determining the gain coefficient and the bias coefficient based on changes of brightness over time at a central position of each optical fiber unit in an optical fiber image and changes of brightness relationships over time between central positions of each optical fiber unit in an optical fiber image.

In some embodiments, the correction coefficient determining module may be optionally configured that the gain coefficient and the bias coefficient are determined according to the following formulas (1) and (2):

$$\upsilon_j(t) = \frac{\alpha_j}{\alpha_i}(\upsilon_i(t) - \beta_i) + \beta_j + \varepsilon_{ij}(t) \qquad \text{formula (1)}$$

$$\upsilon_j(t) \approx \frac{\alpha_j}{\alpha_i}\upsilon_i(t) + \beta_j - \frac{\alpha_j}{\alpha_i}\beta_i, \qquad \text{formula (2)}$$

The brightness correction module 703 may be optionally configured for correcting brightness of the current optical fiber image that has completed a position correction according to a formulas (3):

$$u_i(t) = \alpha_i \upsilon_i(t) + \beta_i \qquad \text{formula (3)}$$

wherein $u_i(t)$ represents a gray value of the corrected central position of the i-th optical fiber unit in the t-th frame optical fiber image, $\upsilon_i(t)$ represents a gray value of the central position of the i-th optical fiber unit in the t-th frame optical fiber image, $\upsilon_j(t)$ represents a gray value of the central position of the j-th optical fiber unit in the t-th frame optical fiber image, $\alpha_i$ represents a gain coefficient of the gray value of the central position of the i-th optical fiber unit, $\beta_i$ represents a bias coefficient of the gray value of the central position of the i-th optical fiber unit, $\alpha_j$ represents a gain coefficient of the gray value of the central position of the j-th optical fiber unit, $\beta_j$ represents a bias coefficient of the gray value of the central position of the j-th optical fiber unit, and $\varepsilon_{ij}(t)$ represents an error term between a fitted curve and gray values of the central positions of the i-th optical fiber unit and the j-th optical fiber unit in the t-th frame optical fiber image.

In some embodiments, the optical fiber image correction device 700 further comprises a meshing module, which may be configured for: in the current optical fiber image, dividing a graphical mesh corresponding to each optical fiber unit with the central position of each of corrected optical fiber units as a vertex; for each position other than the vertex in the current optical fiber image, based on a corrected gray value of the central position of each of the corrected optical fiber units contained in the graphical mesh where the each position is located, determining the corrected gray values by using distance-based weighted interpolation. As a result, a final optical fiber image with high smoothness and low noise may be obtained.

In some embodiments, the correction coefficient determining module may be configured that in a process of performing regression and fitting on gray values of a series of optical fiber images changing over time: for a central position of the optical fiber unit whose regression-fitting error is greater than a preset threshold, discarding the gray value of the central position of the optical fiber unit for which the regression-fitting error is greater than the preset threshold; and/or, when the number of the central position of the optical fiber unit whose regression-fitting error is greater than a preset threshold exceeds a preset number of positions, discarding the linear regression-fitting on a series of optical fiber images changing over time. In this way, it can not only obtain better image quality, but also avoid the situation that the local image is affected by the imaging object or system and the whole image is abandoned, that is, the imaging quality and imaging efficiency are improved at the same time.

Figure 8:
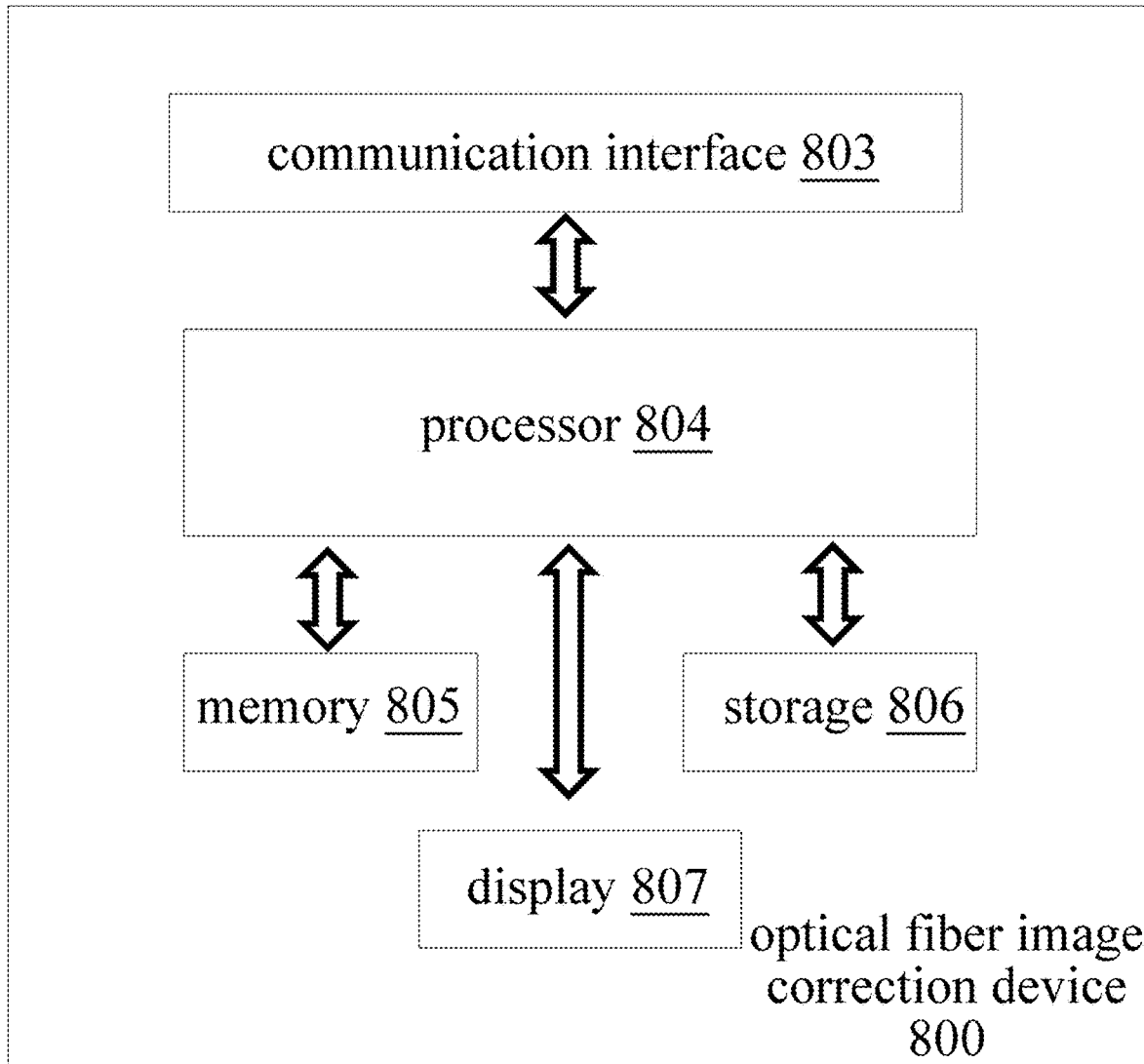
FIG. 8 illustrates a block diagram of an optical fiber image correction device according to an embodiment of the present disclosure.

FIG. 8 illustrates a block diagram of an optical fiber image correction device according to an embodiment of the present disclosure. As shown in FIG. 8, the optical fiber image correction device 800 may comprise a processor 804 and a memory 805. The memory 805 may store a computer executable instruction therein, and the processor 804 may be configured, when executing the computer executable instruction, to implement the optical fiber image correction method according to any one of the embodiments of the present application. For example, the processor 804 may be configured for: obtaining a current optical fiber image and a central reference position of an optical fiber, wherein, the current optical fiber image is an optical fiber image acquired at the current moment, the optical fiber comprises a plurality of optical fiber units, and the central reference position of the optical fiber comprises a central reference position of each optical fiber unit; in the current optical fiber image, correcting a central position of each optical fiber unit in the current optical fiber image according to a position difference condition between the central reference position of the optical fiber and a target position determined based on gray values in a neighboring range of the central reference position of the optical fiber; correcting brightness of the current optical fiber image that has completed a position correction according to a currently determined brightness correction coefficient. With the optical fiber image correction device 800, in the process of observing objects with the microendoscopic, it not only can quickly and efficiently realize correction of the optical fiber drift aiming at the acquired optical fiber image, but also can quickly and efficiently realize real-time correction of parameters, thereby improving the quality of the optical fiber image during observation and ensuring consistency of the quality of the optical fiber image so as to improve the accuracy of subsequent diagnosis.

The memory 805 is used as an example of the computer readable storage medium. The computer readable storage medium stores a computer executable instruction therein, and the computer executable instruction may be configured, when executed by a processor, to implement the optical fiber image correction method according to any one of the embodiments of the present disclosure.

The optical fiber image correction device 800 may be a dedicated computer, a general-purpose computer, or even in the cloud. For example, the optical fiber image correction device 800 may be a computer customized to perform optical fiber signal data acquisition and processing tasks. As shown in FIG. 8, the optical fiber image correction device 800 may further comprise a communication interface 803, a storage 806, and a display 807.

The communication interface 803 may include a network adapter, a cable connector, a serial connector, a USB connector, a parallel connector, a high-speed data transfer adapter (such as optical fiber, USB 3.0, Thunderbolt interface, etc.), a wireless network adapter (such as a WiFi adapter), a telecommunication (3G, 4G/LTE, 5G, etc.) adapter, and the like. The optical fiber image correction device 800 may be connected to other components such as, but not limited to, an optical fiber component of a microscope, an image signal acquisition component, and the like, via the communication interface 803. In some embodiments, the communication interface 803 may be configured to receive the current optical fiber image as well as the central reference position of the optical fiber. In some embodiments, the communication interface 803 may be configured to receive a series of optical fiber images including a current optical fiber image, such as, but not limited to, the previously obtained optical fiber image used for extracting the central position of each optical fiber unit as the central reference position of the optical fiber.

The processor 804 may be a processing device that includes more than one general purpose processing device, such as a microprocessor, a central processing unit (CPU), a graphics processing unit (GPU), and the like. More specifically, the processor may be a Complex Instruction Set Computing (CISC) microprocessor, a Reduced Instruction Set Computing (RISC) microprocessor, a Very Long Instruction Word (VLIW) microprocessor, a processor running another instruction set, or a processor running a combination of instruction sets. The processor 804 may also be more than one specialized processing device, such as an Application Specific Integrated Circuit (ASIC), a Field Programmable Gate Array (FPGA), a Digital Signal Processor (DSP), a System on a Chip (SoC), etc. The processor 804 may be communicatively coupled to the memory 805 and configured to execute computer executable instruction stored thereon to execute the optical fiber image correction method as described in any one of the embodiments of the present disclosure.

The memory 805/storage 806 may be a non-transitory computer-readable medium, such as read only memory (ROM), random access memory (RAM), phase change random access memory (RAM), static random access memory (SRAM), dynamic random access memory (DRAM), electrically erasable programmable read only memory (EEPROM), other types of random access memory (RAM), flash drives or other forms of flash memory, caches, registers, static memory, optical read-only memory (CD-ROM), digital universal optical disc (DVD) or other optical memory, cassette tape or other magnetic storage devices, or any other possible non-transitory medium for storing information or instructions capable of being accessed by a computer device, and the like.

In some embodiments, the storage 806 can store data received, used or generated while executing computer programs, such as, but not limited to, the central position of each optical fiber unit in the previously obtained optical fiber image, the central position of each optical fiber unit before the correction of the current optical fiber image, the central position of each optical fiber unit after correction of the current optical fiber image, the calculated gain coefficient and bias coefficient, a de-meshed image after optical fiber drift correction, a de-meshed image after drift correction and brightness correction, and the like. In some embodiments, the memory 805 may load computer executable instruction from the storage 806, so as to implement the optical fiber image correction method according to any one of the embodiments of the present disclosure. In some embodiments, the memory 805 may store computer executable instruction, such as more than one program for the optical fiber image correction method according to any one of the embodiments of the present disclosure. Individual modules according to any one of the embodiments of the present disclosure may be implemented as program modules on the memory 805 and/or the storage 806.

In some embodiments, the display 807 may include a liquid crystal display (LCD), a light emitting diode display (LED), a plasma display, or any other type of display, and provide a graphical user interface (GUI) presented on the display for user input and image/data display, such as a raw strip grid image, a de-meshed image after drift correction, a de-meshed image after drift correction and brightness correction, and the like. The display may include many different types of materials (such as plastic or glass) and may be touch-sensitive to receive commands from a user. For example, the display may include a touch-sensitive material that is substantially rigid (such as Gorilla Glass; Gorilla® Glass) or substantially flexible (such as Willow Glass; Willow Glass™).

A computer executable instruction is proposed, which is configured, when executed by a processor, to implement the optical fiber image correction method according to any one of the embodiments of the present disclosure. The computer executable instruction may be stored on a medium, which may be a storage medium or a signal medium. The storage medium may be, but is not limited to, an electronic, magnetic, optical, electromagnetic, infrared, or semiconductor system, apparatus, or device, or any combination thereof; specifically, it may be: a portable computer disk, a hard disk, a random access memory (RAM), a read-only memory (ROM), an erasable programmable read-only memory (EPROM) (or flash memory), an optical fiber, a portable compact disc read-only memory (CD-ROM), an optical storage device, a magnetic storage device, or any combination of the foregoing. The signal medium may include, but is not limited to, an electrical signal medium, an optical signal medium, a radio (electromagnetic) wave medium, or any combination of the foregoing.

Moreover, although exemplary embodiments have been described herein, the scope thereof includes any and all embodiments having equivalent elements, modifications, omissions, combinations (e.g., intersections of the various embodiments), adaptations, or variations based on the present disclosure. The elements in the claims are to be interpreted broadly based on the language employed in the claims and are not to be limited to the examples described in this specification or during the practice of this disclosure, which examples are to be interpreted as non-exclusive. Accordingly, this specification and the examples are intended to be considered exemplary only, the true scope and spirit is indicated by the full scope of the following claims, and their equivalents.

The order of the various steps in this application is merely exemplary and not limiting. The order of execution of the steps may be adjusted without affecting the realization of the present disclosure (without destroying the logical relationship between the desired steps), and the various embodiments obtained after adjustment still fall within the scope of the present disclosure.

All terms (including technical or scientific terms) used herein have the same meaning as understood by one of ordinary skill in the art to which this application belongs, unless specifically defined otherwise. It should also be understood that terms defined in general, such as in general dictionaries, should be interpreted as having meanings consistent with their meanings in the context of the relevant art, and should not be interpreted in an idealized or extremely formal sense, unless explicitly defined herein.

The techniques, methods and apparatus known to persons of ordinary skill in the relevant art may not be discussed in detail, but shall be considered as part of the specification where appropriate.

The above description is intended to be illustrative and not limiting. For example, the above examples (or one or more embodiments thereof) may be used in combination with each other. For example, a person of ordinary skill in the art may use other embodiments when reading the above description. Also, in the specific embodiments described above, various features may be grouped together to simplify the present application. This is not to be interpreted as an intention that a feature of the disclosure that is not claimed is essential to any claim. Rather, the subject matter of the present disclosure may be less than all of the features of a particular disclosed embodiment. Thereby, the following claims are hereby incorporated into specific embodiments as examples or embodiments, wherein each claim is independently treated as a separate embodiment and it is contemplated that these embodiments may be combined with each other in various combinations or arrangements. The scope of protection claimed in this application shall be determined by reference to the full scope of the appended claims and their equivalent forms to which those claims are entitled.

The invention claimed is:

1. An optical fiber image correction method, comprising:
obtaining a current optical fiber image and a central reference position of an optical fiber, wherein, the current optical fiber image is an optical fiber image acquired at the current moment, the optical fiber comprises a plurality of optical fiber units, and the central reference position of the optical fiber comprises a central reference position of each optical fiber unit;
in the current optical fiber image, correcting a central position of each optical fiber unit in the current optical fiber image according to a position difference condition between the central reference position of the optical fiber and a target position determined based on gray values in a neighboring range of the central reference position of the optical fiber; and
correcting brightness of the current optical fiber image that has completed a position correction according to a currently determined brightness correction coefficient;
wherein:
"in the current optical fiber image, correcting a central position of each optical fiber unit in the current optical fiber image according to a position difference condition between the central reference position of the optical fiber and a target position determined based on gray values in a neighboring range of the central reference position of the optical fiber", comprises:
in the current optical fiber image, determining a position with the maximum gray value in each neighboring range by taking the central reference position of each optical fiber unit as an origin and searching in the neighboring range of each origin separately;
correcting a central position of each optical fiber unit in the current optical fiber image according to position difference condition between the position with the maximum gray value in each neighboring range and the central reference position of each optical fiber unit in the current optical fiber image;
the brightness correction coefficient is determined by the following steps:
obtaining a pre-stored gain coefficient and a pre-stored bias coefficient, and determining the brightness correction coefficient according to the pre-stored gain coefficient and the pre-stored bias coefficient; or
determining a gain coefficient and a bias coefficient by performing regression and fitting on gray values of a series of optical fiber images changing over time;

determining the brightness correction coefficient based on a determined gain coefficient and a determined bias coefficient.

2. The optical fiber image correction method according to claim 1, wherein "obtaining a central reference position of an optical fiber" comprises:
   obtaining a pre-stored central reference position of an optical fiber; or
   extracting a central position of each optical fiber unit from a previously obtained optical fiber image, and taking an extracted central position of each optical fiber unit as the central reference position of the optical fiber.

3. The optical fiber image correction method according to claim 2, wherein the previously obtained optical fiber image is acquired earlier than the current optical fiber image.

4. The optical fiber image correction method according to claim 1, wherein "determining a gain coefficient and a bias coefficient by performing regression and fitting on gray values of a series of optical fiber images changing over time", comprises:
   determining the gain coefficient and the bias coefficient based on changes of brightness over time at a central position of each optical fiber unit in an optical fiber image and changes of brightness relationships over time between central positions of each optical fiber unit in an optical fiber image.

5. The optical fiber image correction method according to claim 4, wherein
   the gain coefficient and the bias coefficient are determined according to the following formulas (1) and (2):

$$v_j(t) = \frac{\alpha_j}{\alpha_i}(v_i(t) - \beta_i) + \beta_j + \varepsilon_{ij}(t) \quad \text{formula (1)}$$

$$v_j(t) \simeq \frac{\alpha_j}{\alpha_i} v_i(t) + \beta_j - \frac{\alpha_j}{\alpha_i}\beta_i \quad \text{formula (2)}$$

correcting brightness of the current optical fiber image that has completed a position correction according to a formulas (3):

$$u_i(t) = \alpha_i v_i(t) + \beta_i \quad \text{formula (3)}$$

wherein $u_i(t)$ represents a gray value of the corrected central position of the i-th optical fiber unit in the t-th frame optical fiber image, $v_i(t)$ represents a gray value of the central position of the i-th optical fiber unit in the t-th frame optical fiber image, $v_j(t)$ represents a gray value of the central position of the j-th optical fiber unit in the t-th frame optical fiber image, $\alpha_i$ represents a gain coefficient of the gray value of the central position of the i-th optical fiber unit, $\beta_i$ represents a bias coefficient of the gray value of the central position of the i-th optical fiber unit, $\alpha_j$ represents a gain coefficient of the gray value of the central position of the j-th optical fiber unit, $\beta_j$ represents a bias coefficient of the gray value of the central position of the j-th optical fiber unit, and $\varepsilon_{ij}(t)$ represents an error term between a fitted curve and gray values of the central positions of the i-th optical fiber unit and the j-th optical fiber unit in the t-th frame optical fiber image.

6. The optical fiber image correction method according to claim 1, wherein in a process of performing regression and fitting on gray values of a series of optical fiber images changing over time,
   for a central position of the optical fiber unit whose regression-fitting error is greater than a preset threshold, abandoning gray values of the central position of the optical fiber unit whose regression-fitting error is greater than the preset threshold; and/or
   when the number of the central position of the optical fiber unit whose regression-fitting error is greater than a preset threshold exceeds a preset number of positions, abandoning regression and fitting on the series of optical fiber images changing over time.

7. The optical fiber image correction method according to claim 1, wherein "correcting brightness of the current optical fiber image that has completed a position correction" further comprises:
   in the current optical fiber image, dividing a graphical mesh corresponding to each optical fiber unit with the central position of each of corrected optical fiber units as a vertex;
   for each position other than the vertex in the current optical fiber image, based on a corrected gray value of the central position of each of the corrected optical fiber units contained in the graphical mesh where the each position is located, determining the corrected gray values by using distance-based weighted interpolation.

8. The optical fiber image correction method according to claim 1, further comprising:
   storing the central position of each optical fiber unit in the current optical fiber image that has completed a position correction, so as to obtain the central reference position of the optical fiber.

9. An optical fiber image correction device, comprising:
   an obtaining module configured for obtaining a current optical fiber image and a central reference position of an optical fiber, wherein, the current optical fiber image is an optical fiber image acquired at the current moment, the optical fiber comprises a plurality of optical fiber units, and the central reference position of the optical fiber comprises a central reference position of each optical fiber unit;
   a drift correction module configured for, in the current optical fiber image, correcting a central position of each optical fiber unit in the current optical fiber image according to a position difference condition between the central reference position of the optical fiber and a target position determined based on gray values in a neighboring range of the central reference position of the optical fiber;
   a brightness correction module configured for correcting brightness of the current optical fiber image that has completed a position correction according to a currently determined brightness correction coefficient;
   wherein:
   the drift correction module is further configured for:
      in the current optical fiber image, determining a position with the maximum gray value in each neighboring range by taking the central reference position of each optical fiber unit as an origin and searching in the neighboring range of each origin separately;
      correcting a central position of each optical fiber unit in the current optical fiber image according to position difference condition between the position with the maximum gray value in each neighboring range and the central reference position of each optical fiber unit in the current optical fiber image;
   the brightness correction module is configured for determining the brightness correction coefficient by the following steps:
      obtaining a pre-stored gain coefficient and a pre-stored bias coefficient, and determining the brightness correction coefficient according to the pre-stored gain coefficient and the pre-stored bias coefficient; or determining a gain coefficient and a bias coefficient by performing regression and fitting on gray values of a series of optical fiber images changing over time; determining the brightness correction coefficient based on a determined gain coefficient and a determined bias coefficient.

10. An optical fiber image correction device, comprising a processor and a memory, the memory stores a computer executable instruction therein, and the processor is configured, when executing the computer executable instruction, to implement the optical fiber image correction method according to claim 1.

11. A non-transitory computer readable storage medium, wherein the computer readable storage medium stores a computer executable instruction therein, and the computer executable instruction is configured, when executed by a processor, to implement the optical fiber image correction method according to claim 1.

* * * * *